(12) United States Patent
Okuda et al.

(10) Patent No.: US 9,493,062 B2
(45) Date of Patent: Nov. 15, 2016

(54) VEHICLE DRIVE DEVICE

(75) Inventors: Koichi Okuda, Okazaki (JP); Makoto Funahashi, Gotenba (JP); Atsushi Tabata, Okazaki (JP); Keita Imai, Toyota (JP); Sho Mizushino, Chiryu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/374,601

(22) PCT Filed: Feb. 3, 2012

(86) PCT No.: PCT/JP2012/052564
§ 371 (c)(1),
(2), (4) Date: Jul. 25, 2014

(87) PCT Pub. No.: WO2013/114631
PCT Pub. Date: Aug. 8, 2013

(65) Prior Publication Data
US 2015/0031488 A1    Jan. 29, 2015

(51) Int. Cl.
*F16H 3/72* (2006.01)
*F16H 37/06* (2006.01)
(Continued)

(52) U.S. Cl.
CPC .............. *B60K 6/365* (2013.01); *B60K 6/40* (2013.01); *B60K 6/445* (2013.01); *B60K 6/448* (2013.01); *B60K 6/547* (2013.01); *F16H 3/66* (2013.01); *F16H 48/10* (2013.01);
(Continued)

(58) Field of Classification Search
CPC ............... F16H 2200/0021; F16H 2200/2007; B60K 6/365
See application file for complete search history.

(56) References Cited

U.S. PATENT DOCUMENTS 3,869,939 A * 3/1975 Miyao ............... F16H 47/04
475/80
4,164,156 A * 8/1979 Reed ................ F16H 47/04
475/24
(Continued)

FOREIGN PATENT DOCUMENTS

JP       09-226393 A    9/1997
JP    2007-001445 A    1/2007
(Continued)

*Primary Examiner* — Tisha Lewis
(74) *Attorney, Agent, or Firm* — Andrews Kurth Kenyon LLP

(57) ABSTRACT

A vehicle drive device comprising: an engine, a first electric motor, and a second electric motor disposed on a first axis; a first axis output portion outputting power of the first axis; a second axis input portion that is an input portion of a second axis to which power from the first axis output portion is input, the second axis being parallel to the first axis; a second axis output portion outputting power of the second axis; a transmission changing speed between the second axis input portion and the second axis output portion, the transmission being disposed on the second axis; and a third axis input portion that is an input portion of a third axis to which power from the second axis output portion is input, the third axis being parallel to the first axis, the first axis output portion, the second axis input portion, the second axis output portion, and the third axis input portion all being disposed between the first electric motor and the second electric motor in a direction of the first axis, the transmission including at least a first planetary gear device and a second planetary gear device, the second axis input portion and the second axis output portion being disposed between the first planetary gear device and the second planetary gear device in a direction of the second axis.

9 Claims, 5 Drawing Sheets

(51) Int. Cl.
- *B60K 6/365* (2007.10)
- *B60K 6/40* (2007.10)
- *B60K 6/445* (2007.10)
- *B60K 6/547* (2007.10)
- *B60K 6/448* (2007.10)
- *F16H 3/66* (2006.01)
- *F16H 48/10* (2012.01)
- *F16H 3/44* (2006.01)

(52) U.S. Cl.
CPC ... *B60Y 2400/426* (2013.01); *F16H 2003/445* (2013.01); *F16H 2200/0021* (2013.01); *F16H 2200/0043* (2013.01); *F16H 2200/0082* (2013.01); *F16H 2200/201* (2013.01); *Y02T 10/6239* (2013.01); *Y02T 10/6243* (2013.01); *Y10S 903/911* (2013.01)

(56) References Cited

U.S. PATENT DOCUMENTS

| | | | |
|---|---|---|---|
| 6,155,364 A | 12/2000 | Nagano et al. | |
| 7,822,524 B2* | 10/2010 | Tabata | B60K 6/445 180/65.1 |
| 2005/0245349 A1* | 11/2005 | Tabata | B60K 6/38 477/3 |
| 2006/0102409 A1* | 5/2006 | Kamada | B60K 6/365 180/249 |
| 2009/0098969 A1 | 4/2009 | Tabata et al. | |
| 2010/0044128 A1 | 2/2010 | Oba et al. | |
| 2010/0248891 A1* | 9/2010 | Wittkopp | B60K 6/365 477/3 |

FOREIGN PATENT DOCUMENTS

| | | |
|---|---|---|
| JP | 2008-105495 A | 5/2008 |
| JP | 2011-207408 A | 10/2011 |

* cited by examiner

|  | C1 | C2 | B1 | B2 | F1 |
|---|---|---|---|---|---|
| 1st | ○ |  |  | (○) | △ |
| 2nd | ○ |  | ○ |  |  |
| 3rd | ○ | ○ |  |  |  |
| 4th |  | ○ | ○ |  |  |
| Rev | ○ |  |  | ○ |  |
| N |  |  |  |  |  |

○ ENGAGED
(○) ENGAGED ONLY DURING ENGINE BRAKE
△ ENGAGED ONLY DURING DRIVE

VEHICLE DRIVE DEVICE

CROSS-REFERENCE TO RELATED APPLICATIONS

This is a national phase application based on the PCT International patent Application No. PCT/JP2012/052564 filed Feb. 3, 2012, the entire contents of which are incorporated herein by reference.

TECHNICAL FIELD

The present invention relates to a technique of achieving miniaturization of a vehicle drive device in a hybrid vehicle.

BACKGROUND ART

A vehicle drive device is conventionally well-known that has an engine, a first electric motor, and a second electric motor disposed on a first axis and a transmission disposed on a second axis parallel to the first axis. For example, this corresponds to a vehicle drive device described in Patent Document 1. In the vehicle drive device of Patent Document 1, one end portion of the first axis and one end portion of the second axis located on the side opposite to the engine are coupled to each other so that power is transmitted between the first axis and the second axis. A differential gear device is disposed on a third axis parallel to the first axis, and the other end portion of the second axis located on the side opposite to the one end portion across the transmission and the differential gear device are coupled to each other. As a result, power is transmitted between the second axis and the third axis.

PRIOR ART DOCUMENT

Patent Document

Patent Document 1: Japanese Laid-Open Patent Publication No. 2007-001445

SUMMARY OF THE INVENTION

Problem to be Solved by the Invention

Miniaturization of the vehicle drive device is desired in terms of mountability of the vehicle drive device on a vehicle. For example, it is desirable that an external form of the vehicle drive device is made smaller not only in a direction parallel to the first axis, i.e., an axial direction, but also in a direction orthogonal to the first axis, i.e., a radial direction. To reduce an external form dimension of the vehicle drive device in the radial direction, an inter-axis distance must be reduced between the first axis and the third axis. However, the inter-axis distance is restricted by external forms of components disposed on the respective axes adjacently in the radial direction. The vehicle drive device of Patent Document 1 has a configuration making the reduction in the inter-axis distance difficult and therefore has a large inter-axis distance, resulting in an unknown problem of poor mountability on a vehicle attributable to an external form dimension in the radial direction.

The present invention was conceived in view of the situations and it is therefore an object of the present invention to provide a vehicle drive device including an engine, a first electric motor, and a second electric motor, and making it easier to ensure favorable vehicle mountability.

Means for Solving the Problem

To achieve the object, the first aspect of the invention provides a vehicle drive device comprising: (a) an engine, a first electric motor, and a second electric motor disposed on a first axis; a first axis output portion outputting power of the first axis; a second axis input portion that is an input portion of a second axis to which power from the first axis output portion is input, the second axis being parallel to the first axis; a second axis output portion outputting power of the second axis; a transmission changing speed between the second axis input portion and the second axis output portion, the transmission being disposed on the second axis; and a third axis input portion that is an input portion of a third axis to which power from the second axis output portion is input, the third axis being parallel to the first axis, (b) the first axis output portion, the second axis input portion, the second axis output portion, and the third axis input portion all being disposed between the first electric motor and the second electric motor in a direction of the first axis, the vehicle drive device, wherein (c) the transmission includes at least a first planetary gear device and a second planetary gear device, wherein (d) the second axis input portion and the second axis output portion are disposed between the first planetary gear device and the second planetary gear device in a direction of the second axis.

Effects of the Invention

Consequently, for the first electric motor and the second electric motor having the large external forms in a radial direction, the first axis output portion, the second axis input portion, the second axis output portion, and the third axis input portion are disposed without adjoining in the radial direction. Therefore, for example, as compared to a configuration in which the input/output portions are not disposed between the first electric motor and the second electric motor, the vehicle drive device can be formed in a configuration facilitating the reduction in the inter-axis distance between the first axis and the third axis. The external form of the vehicle drive device in the radial direction is reduced to easily ensure favorable vehicle mountability.

The first electric motor and the second electric motor are the constituent components having large weight in a drive system except the engine, and the first axis output portion is disposed between the first electric motor and the second electric motor on the first axis. On the second axis, for example, the constituent components of the transmission can be disposed on the both sides in the second axis direction across the second axis input portion and the second axis output portion. Therefore, the vehicle drive device with a good weight balance can easily be configured.

Positions of the second axis input portion and the second axis output portion in the second axis direction are restricted depending on a configuration on the first axis. Therefore, according to the first aspect of the invention, as compared to a configuration with the first planetary gear device and the second planetary gear device disposed together on any one side in the second axis direction relative to the second axis input portion and the second axis output portion, it is advantageous that an axis gap required around the transmission can easily be ensured while the restriction is satisfied in terms of the positions of the second axis input portion and the second axis output portion in the second axis direction. The transmission having a plurality of shift stages can be configured, The second aspect of the invention provides the vehicle drive device recited in the first aspect of the invention, wherein (a) the power from the first axis output portion is transmitted to the second axis input portion via a first intermediate transmission member disposed on a first intermediate axis parallel to the first axis, and wherein (b) the power from the second axis output portion is transmitted to the third axis input portion via a second intermediate transmission member disposed on a second intermediate axis parallel to the first axis. Consequently, as compared to a configuration formed without the first intermediate transmission member and the second intermediate transmission member such that power is directly transmitted from the first axis output portion to the second axis input portion while power is directly transmitted from the second axis output portion to the third axis input portion, the external form of the vehicle drive device in the radial direction can further be reduced.

The third aspect of the invention provides the vehicle drive device recited in the first or second aspect of the invention, wherein (a) the transmission includes at least a first planetary gear device and a second planetary gear device, wherein (b) the second axis input portion and the second axis output portion are disposed between the first planetary gear device and the second planetary gear device in a direction of the second axis. Positions of the second axis input portion and the second axis output portion in the second axis direction are restricted depending on a configuration on the first axis. Therefore, according to the third aspect of the invention, as compared to a configuration with the first planetary gear device and the second planetary gear device disposed together on any one side in the second axis direction relative to the second axis input portion and the second axis output portion, it is advantageous that an axial gap required around the transmission can easily be ensured while the restriction is satisfied in terms of the positions of the second axis input portion and the second axis output portion in the second axis direction. The transmission having a plurality of shift stages can be configured.

The third aspect of the invention provides the vehicle drive device recited in the first or second aspect of the invention, wherein a second axis input supporting portion supporting the second axis input portion rotatably around the second axis is disposed radially inside a second axis output supporting portion supporting the second axis output portion rotatably around the second axis. The second axis input portion is closer to the first electric motor and the second electric motor than the second axis output portion in a power transmission path and, conversely, the second axis output portion is closer to drive wheels than the second axis input portion in the power transmission path. Therefore, the second axis input supporting portion must be reduced in diameter so as to support higher speed rotation, and the second axis output supporting portion must be increased in diameter so as to support higher torque. In this regard, according to the third aspect of the invention, this advantageously facilitates the reduction in diameter of the second axis input supporting portion and the increase in diameter of the second axis output supporting portion.

The fourth aspect of the invention provides the vehicle drive device recited in any one of the first to third aspects of the invention, wherein (a) power is transmitted with speed reduced from the first axis to the second axis, and wherein (b) engagement positions of engagement elements included in the transmission are disposed radially outside the first planetary gear device or the second planetary gear device. Consequently, as compared to a transmission configuration having the engagement positions of the engagement elements disposed radially inside the outer diameters of the first planetary gear device and the second planetary gear device, sufficiently large torque capacities of the engagement elements can be ensured, and the transmission can be miniaturized in the second axis direction. An increase in centrifugal force applied to the engagement element due to an increased diameter of the engagement element can be suppressed by the speed reduction from the first axis to the second axis.

The fifth aspect of the invention provides the vehicle drive device recited in any one of the first to fourth aspects of the invention, wherein (a) on the first axis, a third planetary gear device is disposed that is interposed between the engine and the first axis output portion and that has a differential state controlled by the first electric motor, and wherein (b) the third planetary gear device and the first electric motor act as an electric continuously variable transmission. Consequently, the devices such as an electric motor making up the electric continuously variable transmission can be disposed together on the first axis in the hybrid vehicle having the electric continuously variable transmission.

The sixth aspect of the invention provides the vehicle drive device recited in any one of the first to fourth aspects of the invention, wherein (a) on the first axis, a fluid transmission device is disposed that has an input-side rotating member coupled to the engine and the first electric motor and an output-side rotating member coupled to the first axis output portion and the second electric motor, and wherein (b) the fluid transmission device and the first electric motor act as an electric continuously variable transmission. Consequently, the devices such as an electric motor making up the electric continuously variable transmission can be disposed together on the first axis in the hybrid vehicle having the electric continuously variable transmission.

The seventh aspect of the invention provides the vehicle drive device recited in the second aspect of the invention, wherein on the second intermediate axis, a parking lock mechanism is disposed that mechanically disables rotation of drive wheels. Consequently, the components of the parking lock mechanism are more easily standardized for vehicle drive devices without the transmission.

Preferably, a differential gear device distributing power input to the third axis input portion to a pair of the drive wheels is disposed on the third axis.

Preferably, the second axis input supporting portion, the second axis output supporting portion, and the second axis input portion are disposed in an overlapping manner in the radial direction orthogonal to the second axis. In this regard, at least a portion of the second axis input supporting portion, at least a portion of the second axis output supporting portion, and at least a portion of the second axis input portion may be disposed in an overlapping manner in the radial direction orthogonal to the second axis. Therefore, the width can be made smaller that is occupied by the second axis input supporting portion, the second axis output supporting portion, and the second axis input portion as a whole in the second axis direction.

Preferably, (a) the transmission includes a transmission rotating shaft that is relatively non-rotatably coupled to both one rotating element included in the first planetary gear device and one rotating element included in the second planetary gear device and that is rotatable around the second axis, (b) the first planetary gear device and the second planetary gear device are disposed around the transmission rotation shaft, and (c) the power input to the second axis input portion is transmitted to the transmission rotation shaft via a clutch that is one of the engagement elements included in the transmission and a rotating member disposed outside the first planetary gear device and the second planetary gear device in the second axis direction. Consequently, a space for disposing a configuration supporting the second axis input portion rotatably around the second axis can easily be ensured between the first planetary gear device and the second planetary gear device.

MODE FOR CARRYING OUT THE INVENTION

An example of the present invention will now be described in detail with reference to the drawings.

EXAMPLE 1

Figure 1:
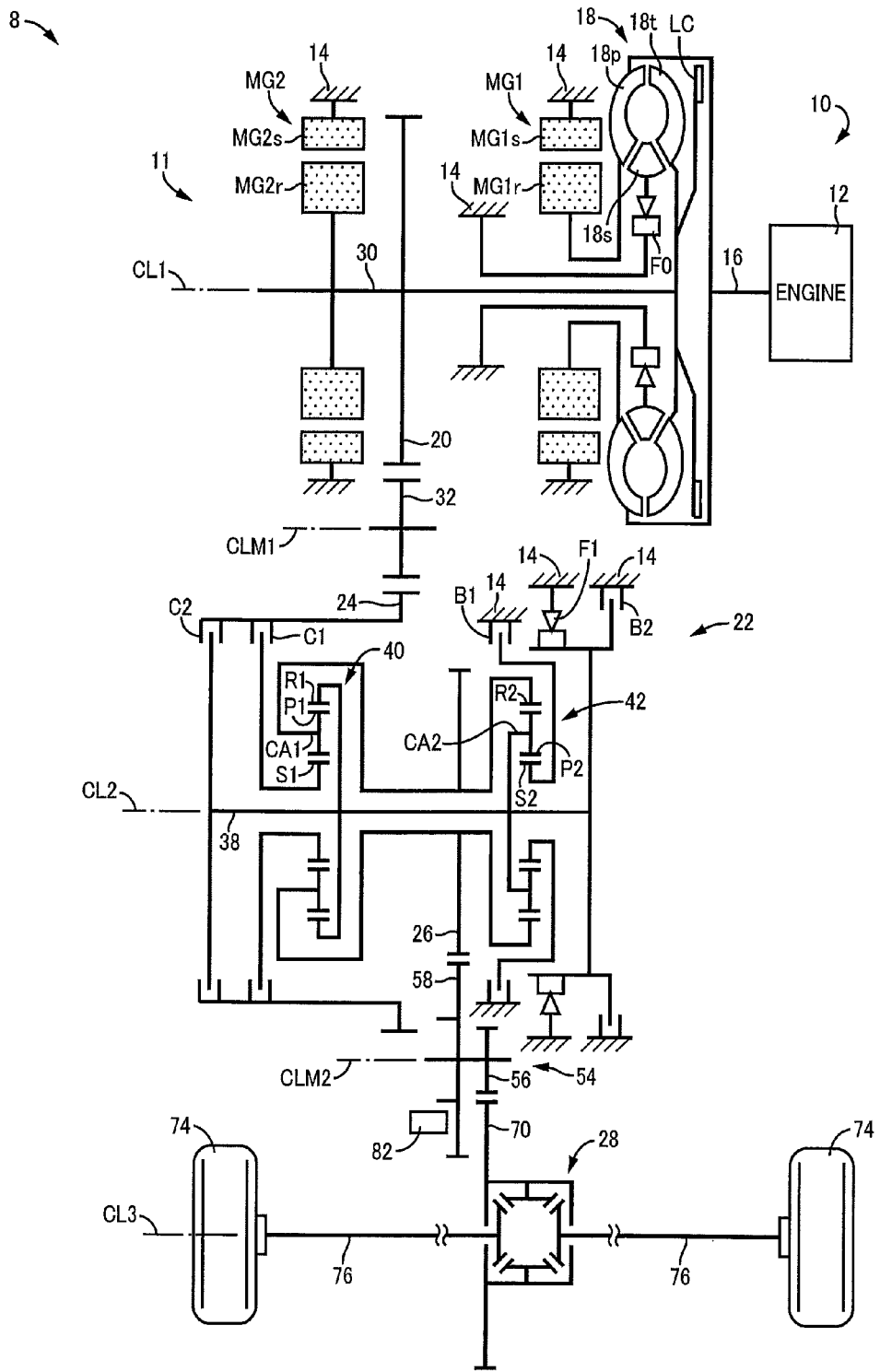
FIG. 1 is a schematic in first example for explaining a configuration of a hybrid vehicle to which the present invention is applied.
Figure 2:
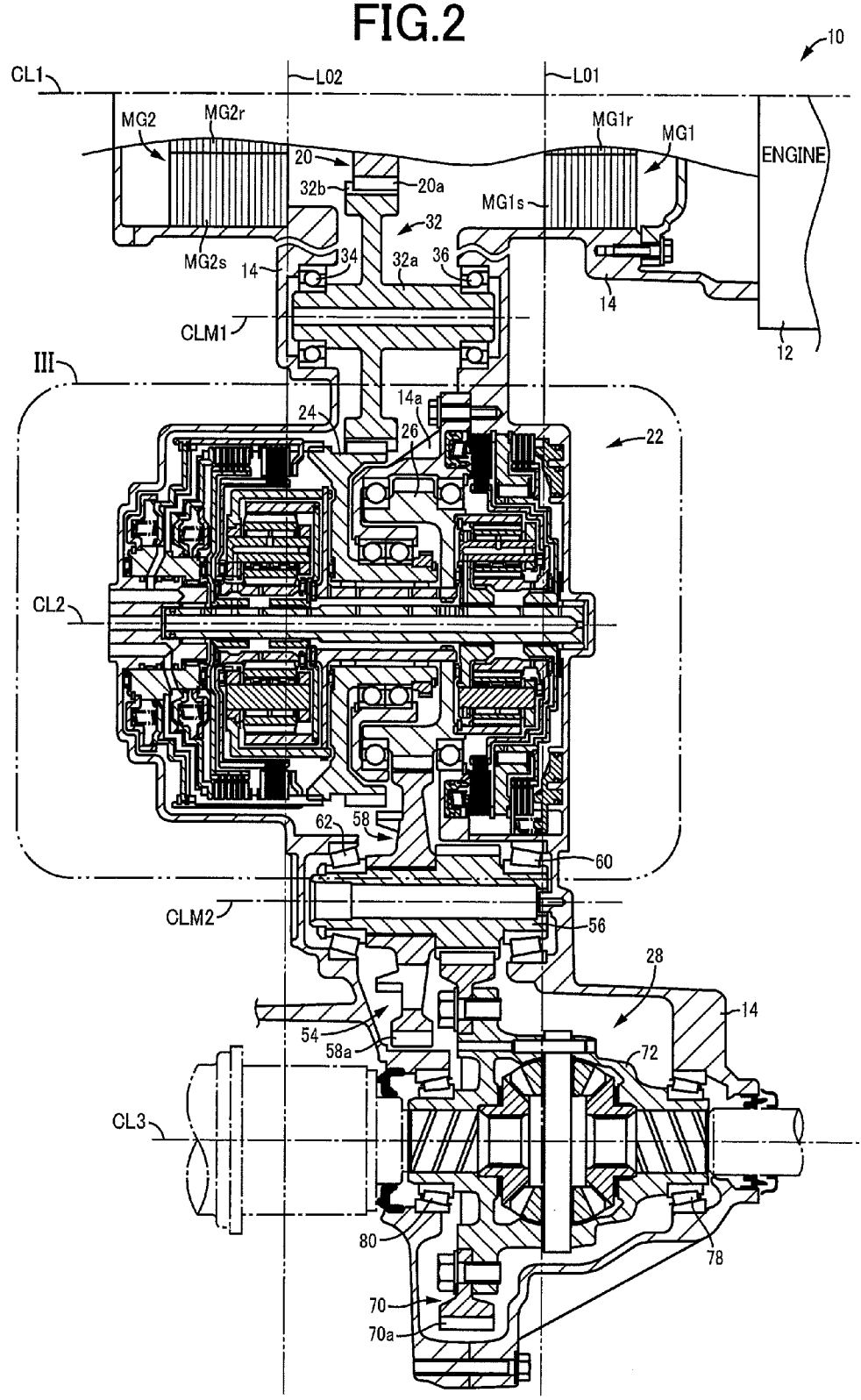
FIG. 2 is a cross-sectional view for explaining a configuration of a vehicle drive device included in the hybrid vehicle of FIG. 1.
Figure 3:
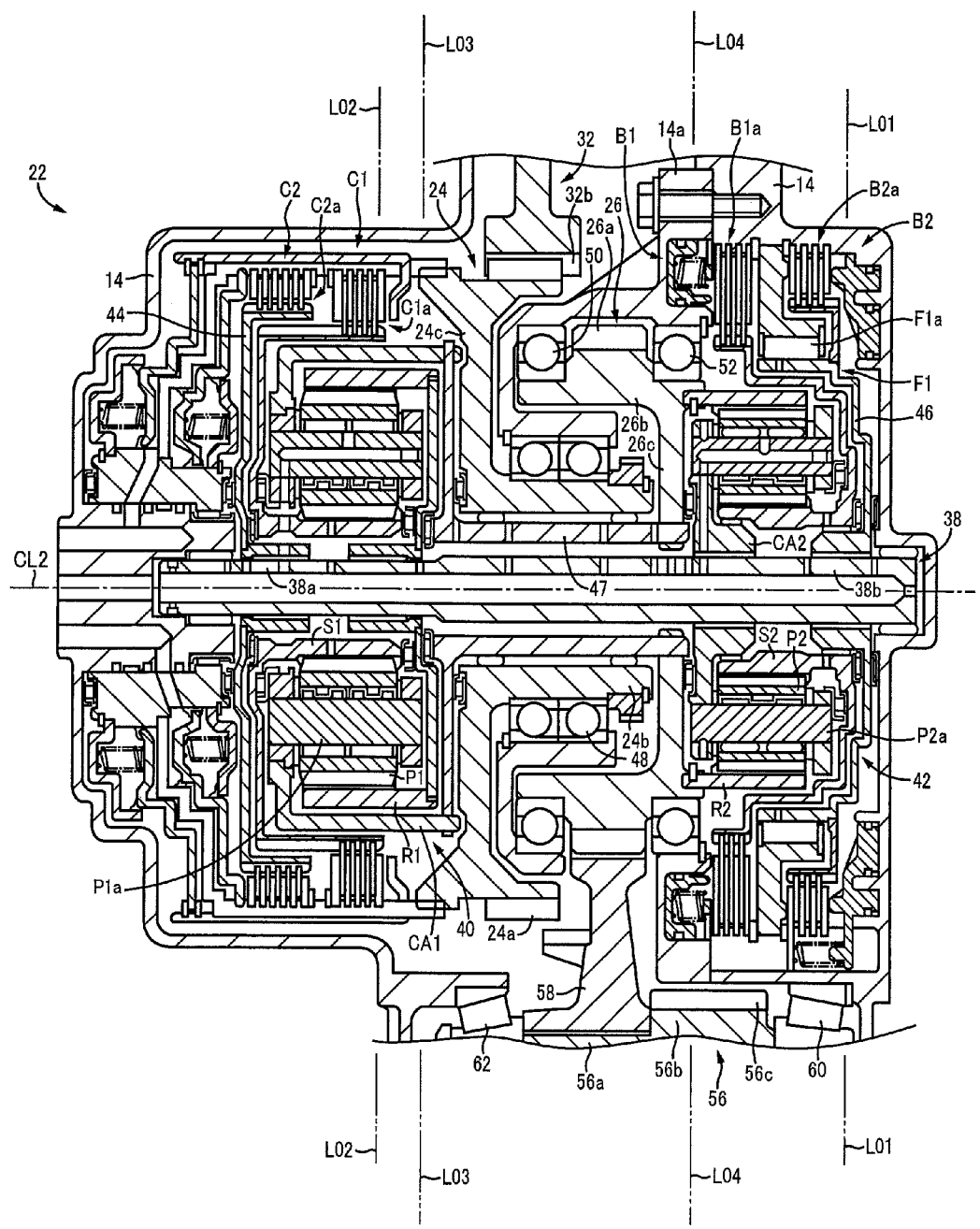
FIG. 3 is an enlarged cross-sectional view of a III portion including an automatic transmission and the vicinity thereof in FIG. 2.

FIG. 1 is a schematic for explaining a configuration of a hybrid vehicle 8 (hereinafter referred to as a vehicle 8) to which the present invention is applied. FIG. 2 is a cross-sectional view for explaining a configuration of a vehicle drive device 10 (hereinafter referred to as a drive device 10) included in the vehicle 8. FIG. 3 is an enlarged cross-sectional view of a III portion including an automatic transmission 22 and the vicinity thereof in FIG. 2. The vehicle 8 is an FF (front-engine front-drive) type vehicle or may be of another drive type. The drive device 10 includes an engine 12 acting as a drive force source for running such as known gasoline and diesel engines and a vehicle power transmission device 11 (hereinafter referred to as a power transmission device 11) transmitting power of the engine 12 to drive wheels 74. The engine 12 corresponds to an engine of the present invention.

As depicted in FIGS. 1 and 2, the power transmission device 11 includes five rotation axes parallel to each other in a casing 14 that is a housing of the power transmission device 11, or specifically, a first axis CL1, a second axis CL2, a third axis CL3, a first intermediate axis CLM1, and a second intermediate axis CLM2. The first axis CL1 is identical to rotation axis of the engine 12 and, an input shaft 16 of the power transmission device 11, a torque converter 18, a first electric motor MG1, a first output gear 20, and a second electric motor MG2 are disposed on the first axis CL1 in order from the engine 12 side. The automatic transmission 22, a second input gear 24, and a second output gear 26 are disposed on the second axis CL2. A differential gear device 28 acting as a final reduction gear is disposed on the third axis CL3. Although the five rotation axes (CL1 to CL3, CLM1, CLM2) are not actually disposed on one plane, the five rotation axes are developed and depicted on one plane in FIGS. 1 and 2.

The casing 14 is a non-rotating member made up of a plurality of case members fixed to each other by bolting etc., and houses the torque converter 18, the first electric motor MG1, the second electric motor MG2, the automatic transmission 22, the differential gear device 28, etc.

The input shaft 16 of the power transmission device 11 is supported rotatably around the first axis CL1 via a bearing to the casing 14.

The torque converter 18 is a fluid transmission device including a pump impeller 18$p$ that is an input-side rotating member relatively non-rotatably coupled to the input shaft 16, a turbine impeller 18$t$ that is an output-side rotating member coupled to a first rotation shaft 30 rotatable around the first axis CL1, a stator impeller 18$s$, and a unidirectional clutch F0. Therefore, in the torque converter 18, the power from the engine 12 is input via the input shaft 16 to the pump impeller 18$p$ and is output from the turbine impeller 18$t$ to the first rotation shaft 30. The pump impeller 18$p$ is coupled relatively non-rotatably to a crankshaft of the engine 12 as well as a rotor MG1$r$ of the first electric motor MG1 and is rotationally driven by the engine 12 or the first electric motor MG1 to generate a fluid flow due to a flow of operating oil in the torque converter 18. The turbine impeller 18$t$, i.e., a turbine runner, is rotated in response to the fluid flow from the pump impeller 18$p$. The stator impeller 18$s$ is disposed in the fluid flow from the pump impeller 18$p$ to the turbine impeller 18$t$ and is supported by the unidirectional clutch F0 rotatably in the positive rotation direction of the input shaft 16 (the rotation direction of the input shaft 16 during operation of the engine 12) and non-rotatably in the negative rotation direction. The first rotation shaft 30 also acts as an output shaft, i.e., a turbine shaft, of the torque converter 18.

The torque converter 18 includes a lockup clutch LC selectively coupling the pump impeller 18$p$ and the turbine impeller 18$t$. The lockup clutch LC has an engagement force continuously varied through hydraulic control and is controlled to one of an engaged state, a slipping state, and a released state.

The first electric motor MG1 includes the rotor MG1$r$ rotatable relatively to the first rotation shaft 30 and a stator MG1$s$ non-rotatably fixed to the casing 14 by bolting etc., and is, for example, an AC synchronous motor generator having a motor function and an electric generation function. Since the first electric motor MG1 rotor MG1$r$ is relatively non-rotatably coupled to the input shaft 16, i.e., the crankshaft of the engine 12, the engine 12 can be cranked by the first electric motor MG1 at the time of engine start, for example.

The second electric motor MG2 is the same motor generator as the first electric motor MG1. The second electric motor MG2 includes a rotor MG2$r$ relatively non-rotatably coupled to the first rotation shaft 30 and a stator MG2$s$ non-rotatably fixed to the casing 14 by bolting etc.

The first output gear 20 is relatively non-rotatably coupled to the first rotation shaft 30 and rotates around the first axis CL1 integrally with the first rotation shaft 30, the rotor MG2$r$ of the second electric motor MG2, and the turbine impeller 18$t$. The first output gear 20 includes outer circumferential teeth 20$a$ on an outer circumferential portion thereof and, for example, a tip diameter of the outer circumferential teeth 20a is smaller than external forms of the stator MG1s of the first electric motor MG1 and the stator MG2s of the second electric motor MG2 as depicted in FIG. 2. The outer circumferential teeth 20a of the first output gear 20 act as a first axis output portion outputting power of the first axis CL1 that is power of the engine 12, the first electric motor MG1, or the second electric motor MG2, for example.

The power transmission device 11 includes a first intermediate transmission member 32 on the first intermediate axis CLM1. The first intermediate transmission member 32 is a first intermediate gear including a shaft portion 32a and outer circumferential teeth 32b. The shaft portion 32a has both ends rotatably supported via bearings 34, 36 to the casing 14. Therefore, the first intermediate transmission member 32 is supported rotatably around the first intermediate axis CLM1. The outer circumferential teeth 32b are meshed with the outer circumferential teeth 20a of the first output gear 20 and are also meshed with outer circumferential teeth 24a of the second input gear 24. Therefore, the power from the outer circumferential teeth 20a of the first output gear 20 is transmitted via the first intermediate transmission member 32 to the outer circumferential teeth 24a of the second input gear 24. The number of teeth of the outer circumferential teeth 24a of the second input gear 24 is larger than the number of teeth of the outer circumferential teeth 20a of the first output gear 20, and the power is transmitted with speed reduced from the first output gear 20 to the second input gear 24. In short, the power is transmitted with speed reduced from the first axis CL1 to the second axis CL2.

The automatic transmission 22 is a planetary gear type multistage transmission including a transmission rotation shaft 38 rotatable around the second axis CL2, a first planetary gear device 40 and a second planetary gear device 42 disposed around the transmission rotation shaft 38, and a plurality of engagement devices (C1, C2, B1, B2, F1). The automatic transmission 22 changes speed in power transmission between the second input gear 24 and the second output gear 26. The plurality of the engagement devices is specifically a first clutch C1, a second clutch C2, a first brake B1, a second brake B2, and a unidirectional clutch F1. Both the first planetary gear device 40 and the second planetary gear device 42 are of a single pinion type.

Figures 4, 5:
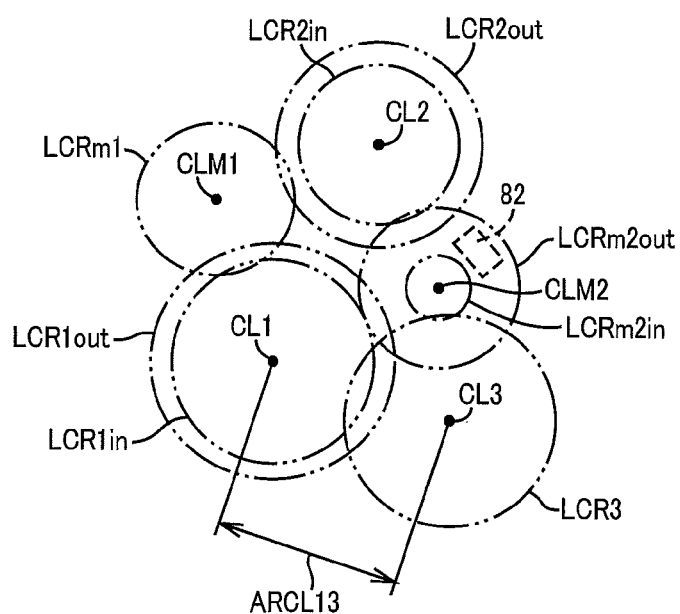
FIG. 4 is an operation table describing an operation of engagement devices when a plurality of shift stages is established in the automatic transmission of FIG. 1.
FIG. 5 is a diagram of the vehicle drive device of FIG. 2 viewed from a direction parallel to the first axis and is a simplified diagram of arrangement positions of the first axis, the second axis, the third axis, the first intermediate axis, and the second intermediate axis.

In the automatic transmission 22, the engagement devices (C1, C2, B1, B2, F1) are respectively engaged or released in accordance with a predetermined operation table depicted in FIG. 4 to alternatively establish a plurality of shift stages having respective different gear ratios γ(=rotation speed Natin of the second input gear 24/rotation speed Natout of the second output gear 26) of the automatic transmission 22. Specifically, as depicted in FIG. 4, the shift stages consisting of four forward stages and one reverse stage are alternatively established. In FIG. 4, "○" indicates that the engaged state is achieved; "(○)" indicates that the engaged state is achieved only during engine brake; "●" indicates that the engaged state is achieved only during drive; and a blank indicates that the released state is achieved.

The first planetary gear device 40 includes a first sun gear S1, a first pinion gear P1, a first carrier CA1 supporting the first pinion gear P1 in a rotatable and revolvable manner, and a first ring gear R1 meshed via the first pinion gear P1 with the first sun gear S1, and three rotating elements are made up of the first sun gear S1, the first carrier CA1, and the first ring gear R1. The second planetary gear device 42 is disposed closer to the engine 12 than the first planetary gear device 40 in the second axis CL2 direction. The second planetary gear device 42 includes a second sun gear S2, a second pinion gear P2, a second carrier CA2 supporting the second pinion gear P2 in a rotatable and revolvable manner, and a second ring gear R2 meshed via the second pinion gear P2 with the second sun gear S2, and three rotating elements are made up of the second sun gear S2, the second carrier CA2, and the second ring gear R2.

The clutches C1 and C2 (hereinafter referred to as clutches C if not particularly distinguished) and the brakes B1 and B2 (hereinafter referred to as brakes B if not particularly distinguished) are wet multi-plate type friction engagement devices operated through hydraulic control, for example. With regard to an engagement position C1a of the first clutch C1, i.e., the engagement position C1a at which a plurality of friction plates included in the first clutch C1 is overlapped in the second axis CL2 direction, and an engagement position C2a of the second clutch C2, i.e., the engagement position C2a at which a plurality of friction plates included in the second clutch C2 is overlapped in the second axis CL2 direction, the both engagement positions C1a and C2a are disposed radially outside the first planetary gear device 40, i.e., radially outside the first ring gear R1. With regard to an engagement position B1a of the first brake B1, i.e., the engagement position B1a at which a plurality of friction plates included in the first brake B1 is overlapped in the second axis CL2 direction, and an engagement position B2a of the second brake B2, i.e., the engagement position B2a at which a plurality of friction plates included in the second brake B2 is overlapped in the second axis CL2 direction, the both engagement positions B1a and B2a are disposed radially outside the second planetary gear device 42, i.e., radially outside the second ring gear R2. An engagement position F1a of the unidirectional clutch F1 is also disposed radially outside the second planetary gear device 42. In short, the engagement positions C1a, C2a, B1a, B2a, and F1a of all the engagement elements included in the automatic transmission 22 are disposed radially outside the first planetary gear device 40 or the second planetary gear device 42.

The first sun gear S1 of the first planetary gear device 40 is relatively rotatable to the transmission rotation shaft 38 and is coupled via the first clutch C1 to the second input gear 24. Therefore, the first clutch C1 selectively couples the first sun gear S1 to the second input gear 24. The first carrier CA1 is relatively non-rotatably coupled to the second output gear 26. The first ring gear R1 is relatively non-rotatably coupled to the transmission rotation shaft 38.

The second sun gear S2 of the second planetary gear device 42 is relatively rotatable to the transmission rotation shaft 38 and is coupled via the first brake B1 to the casing 14. Therefore, the first brake B1 selectively couples the second sun gear S2 to the casing 14. The second carrier CA2 is relatively non-rotatably coupled to the transmission rotation shaft 38. The second ring gear R2 is relatively non-rotatably coupled to the second output gear 26.

The transmission rotation shaft 38 is coupled via the second clutch C2 to the second input gear 24. Therefore, the second clutch C2 selectively couples the transmission rotation shaft 38 to the second input gear 24. In particular, a second clutch coupling member 44 is a substantially disk-shaped rotating member and is interposed between the transmission rotation shaft 38 and the second clutch C2, and the second clutch coupling member 44 is coupled at an outer circumferential end to the second clutch C2 and is coupled at an inner circumferential end to the transmission rotation shaft 38. The second clutch coupling member 44 is disposed on the outside of the first planetary gear device 40 and the second planetary gear device 42 in the second axis CL2 direction rather than between the first planetary gear device 40 and the second planetary gear device 42, or specifically, is disposed on the side opposite to the second planetary gear device 42 relative to the first planetary gear device 40. Therefore, the power input to the second input gear 24 is transmitted to the transmission rotation shaft 38 via the second clutch C2 and the second clutch coupling member 44 if the second clutch C2 is engaged.

The transmission rotation shaft 38 is coupled via the second brake B2 to the casing 14 at the other end portion 38b on the side opposite to one end portion 38a coupled to the second clutch coupling member 44 and is disposed with the unidirectional clutch F1 in parallel with the second brake B2. Therefore, the transmission rotation shaft 38 is selectively coupled to the casing 14 by the second brake B2 or the unidirectional clutch F1. In particular, a second brake coupling member 46 is a substantially disk-shaped rotating member and is interposed between the transmission rotation shaft 38 and the second brake B2/the unidirectional clutch F1, and the second brake coupling member 46 is coupled at an outer circumferential end and the vicinity thereof to both the second brake B2 and the unidirectional clutch F1 and is coupled at an inner circumferential end to the other end portion 38b of the transmission rotation shaft 38. The second brake coupling member 46 is disposed on the outside of the first planetary gear device 40 and the second planetary gear device 42 in the second axis CL2 direction rather than between the first planetary gear device 40 and the second planetary gear device 42, or specifically, is disposed on the side opposite to the first planetary gear device 40 relative to the second planetary gear device 42. In short, the transmission rotation shaft 38 is coupled to the second brake B2 and the unidirectional clutch F1 via the second brake coupling member 46 disposed outside the first planetary gear device 40 and the second planetary gear device 42 in the second axis CL2 direction.

The second input gear 24 includes the outer circumferential teeth 24a, a cylindrical portion 24b through which the transmission rotation shaft 38 and a cylindrical rotating member 47 relatively non-rotatably coupled to the first carrier CA1 are relatively rotatably inserted, and a flange-shaped portion 24c coupling the outer circumferential teeth 24a and the cylindrical portion 24b. The outer circumferential teeth 24a are meshed via the first intermediate transmission member 32 with the outer circumferential teeth 20a of the first output gear 20 and therefore act as a second axis input portion that is an input portion of the second axis CL2 to which power from the outer circumferential teeth 20a is input. The cylindrical portion 24b is rotatably supported to the casing 14 via two bearings 48 disposed radially outside. Therefore, the bearings 48 act as a second axis input supporting portion supporting the outer circumferential teeth 24a of the second input gear 24 rotatably around the second axis CL2. As described above, the second input gear 24 is disposed as an input gear rotatable around the second axis CL2. Both the outer circumferential teeth 24a and the cylindrical portion 24b are disposed between the first planetary gear device 40 and the second planetary gear device 42, or specifically, between a dashed-two dotted line L03 and a dashed-two dotted line L04 of FIG. 3, in the second axis CL2 direction. The position of the dashed-two dotted line L03 in the second axis CL2 direction is aligned with the position of the external form of the first planetary gear device 40, i.e., the external form minimally required for configuring the first planetary gear device 40, closest to the second planetary gear device 42 and is coincident with a leading end of a rotation shaft P1a of the first pinion gear P1 on the second planetary gear device 42 side, for example. The position of the dashed-two dotted line L04 in the second axis CL2 direction is aligned with the position of the external form of the second planetary gear device 42, i.e., the external form minimally required for configuring the second planetary gear device 42, closest to the first planetary gear device 40 and is coincident with a leading end of a rotation shaft P2a of the second pinion gear P2 on the first planetary gear device 40 side, for example.

The second output gear 26 includes outer circumferential teeth 26a, a cylindrical portion 26b projected from the outer circumferential teeth 26a at a base end of the outer circumferential teeth 26a to both sides in the second axis CL2 direction, and a circular plate-shaped coupling portion 26c disposed on the inner circumferential side of the cylindrical portion 26b to couple the cylindrical portion 26b relatively non-rotatably to the rotating member 47 integrally rotating with the first carrier CA1. The outer circumferential teeth 26a are disposed between the first planetary gear device 40 and the second planetary gear device 42, or specifically, between the dashed-two dotted line L03 and the dashed-two dotted line L04 of FIG. 3, in the second axis CL2 direction. The outer circumferential teeth 26a output the power changed in speed by the automatic transmission 22 on the second axis CL2 and can therefore be considered to act as a second axis output portion outputting power of the second axis CL2. The cylindrical portion 26b is rotatably supported to the casing 14 via bearings 50 and 52 disposed radially outside on the both ends projected from the outer circumferential teeth 26a. Therefore, the outer circumferential teeth 26a are disposed to be located between the bearing 50 and the bearing 52 in the second axis CL2 direction. The bearing 50 and the bearing 52 act as a second axis output supporting portion as a whole supporting the outer circumferential teeth 26a of the second output gear 26 rotatably around the second axis CL2. As depicted in FIG. 3, the outer circumferential teeth 26a of the second output gear 26 and the bearings 50, 52 are disposed radially inside the outer circumferential teeth 24a of the second input gear 24, and the bearing 48 is disposed radially inside the outer circumferential teeth 26a of the second output gear 26 and the bearings 50, 52. The bearing 48, the bearing 50, and the outer circumferential teeth 24a are disposed in an overlapping manner in the radial direction orthogonal to the second axis CL2. The casing 14 has a bearing supporting portion 14a into which the bearing 48 and the bearings 50, 52 are fitted, and the bearing supporting portion 14a can be disassembled from the other constituent members because of bolting.

The power transmission device 11 includes a second intermediate transmission member 54 on the second intermediate axis CLM2. The second intermediate transmission member 54 is supported rotatably around the second intermediate axis CLM2. Specifically, the second intermediate transmission member 54 includes a small diameter second intermediate gear 56 having a shaft portion 56a and a gear portion 56b formed on an outer circumference of the shaft portion 56a, and a large diameter second intermediate gear 58 having a diameter larger than the gear portion 56b of the small diameter second intermediate gear 56 and fitted relatively non-rotatably to the outer circumference of the shaft portion 56a by spline fitting etc. In short, the second intermediate transmission member 54 is a composite gear configured such that the gear portion 56b of the small diameter second intermediate gear 56 and the large diameter second intermediate gear 58 rotated integrally with each other are arranged in order from the engine 12 side in the second intermediate axis CLM2 direction. Outer circumferential teeth 56c are formed on the gear portion 56b of the small diameter second intermediate gear 56, and outer circumferential teeth 58a are formed on the large diameter second intermediate gear 58. The both ends of the shaft portion 56a of the small diameter second intermediate gear 56 are relatively rotatably supported via bearings 60 and 62 to the casing 14, and the bearing 60, the gear portion 56b of the small diameter second intermediate gear 56, the large diameter second intermediate gear 58, and the bearing 62 are disposed in order from the engine 12 side in the second intermediate axis CLM2 direction.

The outer circumferential teeth 58a of the large diameter second intermediate gear 58 are meshed with the outer circumferential teeth 26a of the second output gear 26, and the outer circumferential teeth 56c of the small diameter second intermediate gear 56 are meshed with outer circumferential teeth 70a of a differential ring gear 70 included in the differential gear device 28. Therefore, the power from the outer circumferential teeth 26a of the second output gear 26 is transmitted via the second intermediate transmission member 54 with speed reduced by the second intermediate transmission member 54 to the outer circumferential teeth 70a of differential ring gear 70.

The differential gear device 28 includes a differential case 72 that is a housing of the differential gear device 28, and the differential ring gear 70 that is fixed by bolting to the differential case 72 and that integrally rotates around the third axis CL3 with the differential case 72. The differential gear device 28 is a generally known vehicle differential gear distributing power input to the differential ring gear 70 via a pair of axles 76 to a pair of the drive wheels 74. The differential gear device 28 is relatively rotatably supported at the both ends of the differential case 72 in the third axis CL3 direction via bearings 78 and 80 to the casing 14. In short, the differential gear device 28 is supported rotatably around a third intermediate axis CLM3. The outer circumferential teeth 70a of the differential ring gear 70 are meshed via the second intermediate transmission member 54 with the outer circumferential teeth 26a of the second output gear 26 and therefore act as a third axis input portion that is an input portion of the third axis CL3 to which power from the outer circumferential teeth 26a is input.

The vehicle 8 also includes a parking lock mechanism 82 mechanically preventing rotation of the drive wheels 74 during parking. The parking lock mechanism 82 is a generally known device and is disposed on the second intermediate axis CLM2 as depicted in FIG. 1. Therefore, the parking lock mechanism 82 directly prevents rotation of the second intermediate transmission member 54, thereby preventing the rotation of the drive wheels 74.

As depicted in FIG. 2, the drive device 10 has the outer circumferential teeth 20a of the first output gear 20, the outer circumferential teeth 24a of the second input gear 24, the outer circumferential teeth 26a of the second output gear 26, and the outer circumferential teeth 70a of the differential ring gear 70 all disposed between the first electric motor MG1 and the second electric motor MG2, or specifically, between a dashed-two dotted line L01 and a dashed-two dotted line L02, in the first axis CL1 direction. The dashed-two dotted line L01 and the dashed-two dotted line L02 of FIG. 3 are the same as those of FIG. 2.

According to the configuration of the drive device 10 described above, the power from the engine 12 is output via the torque converter 18 from the first output gear 20 on the first axis CL1. The power output from the first output gear 20 is transmitted to the pair of the drive wheels 74 sequentially via the first intermediate transmission member 32, the second input gear 24, the automatic transmission 22, the second output gear 26, the second intermediate transmission member 54, the differential gear device 28, and a pair of the axles 76.

Since the engine 12 and the first electric motor MG1 are coupled to the pump impeller 18p of the torque converter 18, the drive device 10 can change an operating point of the engine 12 without being restricted by a rotation speed of the turbine impeller 18t, by controlling the first electric motor MG1, for example, by regeneratively operating the first electric motor MG1, while utilizing a slip of the torque converter 18 and a torque amplification effect varying depending on the slip. Electric power regenerated by the first electric motor MG1, i.e., a portion of engine output, is supplied for driving the second electric motor MG2 coupled to the turbine impeller 18t or for charging an electric storage device. As described above, in the configuration of the drive device 10 of this example, the torque converter 18 has a function of a power distribution mechanism distributing the power from the engine 12 to the first electric motor MG1 and the first rotation shaft 30 coupled to the turbine impeller 18t. Since the operating point of the engine 12 can be changed without being restricted by the rotation speed of the turbine impeller 18t, the first electric motor MG1 and the torque converter 18 have a function of an electric continuously variably transmission as a whole.

FIG. 5 is a diagram of the drive device 10 of FIG. 2 viewed from a direction parallel to the first axis CL1 and is a simplified diagram of arrangement positions of the first axis CL1, the second axis CL2, the third axis CL3, the first intermediate axis CLM1, and the second intermediate axis CLM2. In FIG. 5, the upper side corresponds to the vertical upside of the vehicle 8. In FIG. 5, a dashed-two dotted line LCR1 in of a circle around the first axis CL1 represents an external form acquired by linking tooth tips of the first output gear 20, and a dashed-two dotted line LCR1 out represents an external form of a larger one of the stator MG1s of the first electric motor MG1 and the stator MG2s of the second electric motor MG2. Therefore, the dashed-two dotted line LCR1 out represents the most external form of the constituent components disposed on the first axis CL1 except the engine 12. In this example, the stators MG1s and MG2s have the same external form viewed in the axial direction. A dashed-two dotted line LCR2in of a circle around the second axis CL2 represents an external form acquired by linking tooth tips of the second output gear 26, and a dashed-two dotted line LCR2out represents the most external form of the constituent components disposed on the second axis CL2, or specifically, the external form of the second brake B2. A dashed-two dotted line LCR3 of a circle around the third axis CL3 represents the most external form of the constituent components disposed on the third axis CL3, or specifically, the external form acquired by linking tooth tips of the differential ring gear 70. A dashed-two dotted line LCRm1 of a circle around the first intermediate axis CLM1 represents the most external form of the constituent components disposed on the first intermediate axis CLM1, or specifically, the external form acquired by linking tooth tips of the outer circumferential teeth 32b included in the first intermediate transmission member 32. A dashed-two dotted line LCRm2in of a circle around the second intermediate axis CLM2 represents an external form acquired by linking tooth tips of the small diameter second intermediate gear 56, and a dashed-two dotted line LCRm2out represents the most external form of the constituent components disposed on the second intermediate axis CLM2, or specifically, the external form acquired by linking tooth tips of the large diameter second intermediate gear 58.

As depicted in FIG. 5, in the drive device 10, the first axis CL1 and the third axis CL3 are disposed adjacently to each other and a two-way arrow ARCL13 indicates an inter-axis distance between the first axis CL1 and the third axis CL3. As apparent from FIG. 5, when viewed in the first axis CL1 direction, the tooth tips of the differential ring gear 70 indicated by the dashed-two dotted line LCR3 enter the inside of the circle of the dashed-two dotted line LCR1out representative of the most external form of the constituent components disposed on the first axis CL1. The first axis CL1 and the third axis CL3 can be arranged in this way because the outer circumferential teeth 70a of differential ring gear 70 are disposed between the first electric motor MG1 and the second electric motor MG2 in the first axis CL1 direction. Because of the arrangement relationship between the dashed-two dotted line LCR1out and the dashed-two dotted line LCR3, the inter-axis distance indicated by the two-way arrow ARCL13 is shortened as compared to a configuration in which the third axis CL3 cannot be disposed such that the tooth tips of the differential ring gear 70 enter the inside of the circle of the dashed-two dotted line LCR1out.

This example has the following effects (A1) to (A10).

(A1) According to this example, with regard to the outer circumferential teeth 20a of the first output gear 20 corresponding to the first axis output portion outputting power of the first axis CL1, the outer circumferential teeth 24a of the second input gear 24 corresponding to the second axis input portion that is the input portion of the second axis CL2 to which the power from the outer circumferential teeth 20a is input, the outer circumferential teeth 26a of the second output gear 26 corresponding to the second axis output portion outputting the power of the second axis CL2, and the outer circumferential teeth 70a of the differential ring gear 70 corresponding to the third axis input portion that is the input portion of the third axis CL3 to which power from the outer circumferential teeth 26a is input, all the outer circumferential teeth are disposed between the first electric motor MG1 and the second electric motor MG2 in the first axis CL1 direction. Therefore, for the first electric motor MG1 and the second electric motor MG2 having the large external forms in a radial direction, the outer circumferential teeth 20a, 24a, 26a, and 70a are disposed without adjoining in the radial direction. For example, in the case of the configuration intended to shorten the inter-axis distance between the first axis CL1 and the third axis CL3 (see the two-way arrow ARCL13 of FIG. 5), this means that the configuration can be designed without interference of the outer circumferential teeth 70a of the differential ring gear 70 with the first electric motor MG1 and the second electric motor MG2. Therefore, for example, as compared to a configuration in which the outer circumferential teeth 20a, 24a, 26a, and 70a, i.e., the input/output portions, are not disposed between the first electric motor MG1 and the second electric motor MG2, the drive device 10 can be formed in a configuration facilitating the reduction in the inter-axis distance between the first axis CL1 and the third axis CL3 (see the two-way arrow ARCL13). The external form of the drive device 10 in the radial direction is advantageously reduced to easily ensure favorable vehicle mountability.

The first electric motor MG1 and the second electric motor MG2 are the constituent components having large weight in a drive system except the engine 12, and the outer circumferential teeth 20a of the first output gear 20 are disposed between the first electric motor MG1 and the second electric motor MG2 on the first axis CL1. On the second axis CL2, for example, the constituent components of the automatic transmission 22 can be disposed on the both sides in the second axis CL2 direction across the outer circumferential teeth 24a of the second input gear 24 and the outer circumferential teeth 26a of the second output gear 26. Therefore, the drive device 10 with a good weight balance can easily be configured.

(A2) According to this example, the power from the first output gear 20 is transmitted to the second input gear 24 via the first intermediate transmission member 32 disposed on the first intermediate axis CLM1 parallel to the first axis CL1, and the power from the second output gear 26 is transmitted to the differential ring gear 70 via the second intermediate transmission member 54 disposed on the second intermediate axis CLM2 parallel to the first axis CL1. Therefore, as compared to a configuration formed without the first intermediate transmission member 32 and the second intermediate transmission member 54 such that power is directly transmitted from the first output gear 20 to the second input gear 24 while power is directly transmitted from the second output gear 26 to the differential ring gear 70, it is advantageous that the first output gear 20 and the second output gear 26 can be restrained from increasing in diameter and that the external form of the drive device 10 in the radial direction can further be reduced.

(A3) According to this example, the automatic transmission 22 includes the first planetary gear device 40 and the second planetary gear device 42, and the outer circumferential teeth 24a of the second input gear 24 and the outer circumferential teeth 26a of the second output gear 26 are disposed between the first planetary gear device 40 and the second planetary gear device 42, or specifically, between the dashed-two dotted line L03 and the dashed-two dotted line L04 of FIG. 3, in the second axis CL2 direction. Positions of the outer circumferential teeth 24a of the second input gear 24 and the outer circumferential teeth 26a of the second output gear 26 in the second axis CL2 direction are restricted depending on a configuration on the first axis CL1. Therefore, as compared to a configuration with the first planetary gear device 40 and the second planetary gear device 42 disposed together on any one side in the second axis CL2 direction relative to the outer circumferential teeth 24a of the second input gear 24 and the outer circumferential teeth 26a of the second output gear 26, it is advantageous that an axial gap required around the automatic transmission 22 can easily be ensured while the restriction is satisfied in terms of the positions of the outer circumferential teeth 24a and 26a in the second axis CL2 direction. The automatic transmission 22 having a plurality of shift stages can be configured.

(A4) As depicted in FIG. 1 etc., the second input gear 24 is closer to the first electric motor MG1 and the second electric motor MG2 than the second output gear 26 in a power transmission path and, conversely, the second output gear 26 is closer to the drive wheels 74 than the second input gear 24 in the power transmission path. Therefore, the bearing 48 must be reduced in diameter so as to support higher speed rotation, and the bearings 50 and 52 must be increased in diameter so as to support higher torque. In this regard, according to this example, the bearing 48 corresponding to the second axis input supporting portion supporting the second input gear 24 rotatably around the second axis CL2 is disposed radially inside the bearings 50 and 52 corresponding to the second axis output supporting portion supporting the second output gear 26 rotatably around the second axis CL2. Therefore, this advantageously facilitates the reduction in diameter of the bearing 48 for supporting higher speed rotation and the increase in diameter of the bearings 50 and 52 for supporting higher torque.

(A5) According to this example, power is transmitted with speed reduced from the first axis CL1 to the second axis CL2, and the engagement positions C1*a* and C2*a* of the engagement elements C1 and C2 included in the automatic transmission 22 are disposed radially outside the first planetary gear device 40 while the engagement positions B1*a*, B2*a*, and F1*a* of the engagement elements B1, B2, and F1 included in the automatic transmission 22 are disposed radially outside the second planetary gear device 42. Therefore, as compared to a transmission configuration having the engagement positions C1*a*, C2*a*, B1*a*, B2*a*, and F1*a* of the engagement elements C1, C2, B1, B2, and F1 disposed radially inside the outer diameters of the first planetary gear device 40 and the second planetary gear device 42, sufficiently large torque capacities of the engagement elements C1, C2, B1, B2, and F1 can be ensured, and the automatic transmission 22 can be miniaturized in the second axis CL2 direction.

(A6) According to this example, the parking lock mechanism 82 is disposed on the second intermediate axis CLM2. Therefore, the components of the parking lock mechanism 82 are more easily standardized for vehicles without the automatic transmission 22. Since the parking lock mechanism 82 is disposed on the second intermediate axis CLM2 where an extra space exists, the external form of the drive device 10 associated with the parking lock mechanism 82 can be made smaller.

(A7) According to this example, the bearing 48, the bearing 50, and the outer circumferential teeth 24*a* of the second input gear 24 are disposed in an overlapping manner in the radial direction orthogonal to the second axis CL2. Therefore, the width can be made smaller that is occupied by the bearing 48, the bearing 50, and the outer circumferential teeth 24*a* of the second input gear 24 as a whole in the second axis CL2 direction.

(A8) According to this example, the automatic transmission 22 has the first planetary gear device 40 and the second planetary gear device 42 disposed around the transmission rotation shaft 38, and the power input to the second input gear 24 is transmitted to the transmission rotation shaft 38 via the second clutch C2 and the second clutch coupling member 44 that is a rotating member disposed outside the first planetary gear device 40 and the second planetary gear device 42 in the second axis CL2 direction. Therefore, it is advantageous that the space for disposing the bearings 48, 50, and 52 can easily be ensured between the first planetary gear device 40 and the second planetary gear device 42.

(A9) According to this example, the first planetary gear device 40 is disposed on one side in the second axis CL2 direction and the second planetary gear device 42 is disposed on the other side across the outer circumferential teeth 24*a* of the second input gear 24 or the outer circumferential teeth 26*a* of the second output gear 26, and a plurality of the engagement elements (C1, C2, B1, B2, and F1) included in the automatic transmission 22 is respectively assigned and disposed on the one side and the other side in the second axis CL2 direction. Therefore, it is advantageous that the automatic transmission 22 can be configured with a good weight balance and that the automatic transmission 22 can be miniaturized in the second axis CL2 direction.

(A10) According to this example, the torque converter 18 has the pump impeller 18*p* coupled to the engine 12 and the first electric motor MG1 and the turbine impeller 18*t* coupled to the first output gear 20 and the second electric motor MG2 and is disposed on the first axis CL1, and the torque converter 18 and the first electric motor MG1 act as an electric continuously variable transmission. Therefore, the devices such as the first electric motor MG1 and the torque converter 18 making up the electric continuously variable transmission can be disposed together on the first axis CL1 in the vehicle 8.

Another example of the present invention will be described. In the following description, the portions mutually common to the examples are denoted by the same reference numerals and will not be described.

EXAMPLE 2

In this example (second example), the vehicle drive device 10 of the first example is replaced with a different vehicle drive device 210 (hereinafter referred to as a drive device 210). Specifically, the vehicle drive device 210 has a configuration on the first axis CL1 different from the vehicle drive device 10 of the first example and includes a first axis planetary gear device 214 instead of the torque converter 18. The difference of this example from the first example will hereinafter be described.

Figure 6:
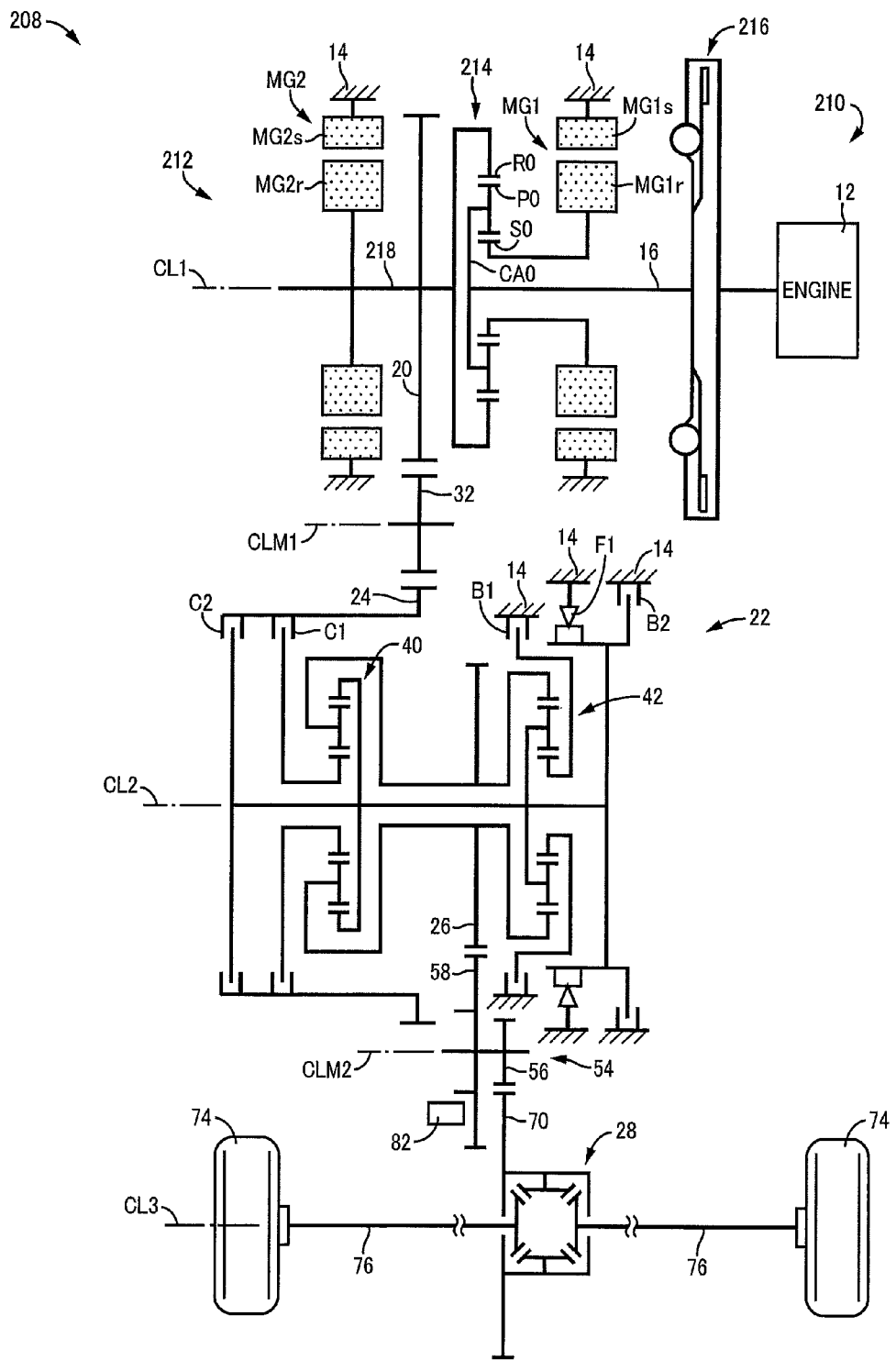
FIG. 6 is a schematic in second example for explaining a configuration of a hybrid vehicle to which the present invention is applied, the configuration being different from that of FIG. 1.

FIG. 6 is a schematic for explaining a configuration of a hybrid vehicle 208 (hereinafter referred to as a vehicle 208) including the drive device 210. As depicted in FIG. 6, the drive device 210 includes a vehicle power transmission device 212 (hereinafter referred to as a power transmission device 212) and an engine 12 coupled via a damper 216 to an input shaft 16 of the power transmission device 212. The first electric motor MG1, the first axis planetary gear device 214, the first output gear 20, and the second electric motor MG2 are disposed on the first axis CL1 in order from the engine 12 side.

The first axis planetary gear device 214 included in the power transmission device 212 is interposed between the engine 12 and the first output gear 20 in a power transmission path and is a single pinion type planetary gear device having a differential state controlled by the first electric motor MG1. The first axis planetary gear device 214 corresponds to a third planetary gear device of the present invention. Specifically, the first axis planetary gear device 214 includes a first axis sun gear S0, a first axis pinion gear P0, a first axis carrier CA0 supporting the first axis pinion gear P0 in a rotatable and revolvable manner, and a first axis ring gear R0 meshed via the first axis pinion gear P0 with the first axis sun gear S0, and three rotating elements are made up of the first axis sun gear S0, the first axis carrier CA0, and the first axis ring gear R0. The first axis sun gear S0 of the first axis planetary gear device 214 is relatively non-rotatably coupled to the rotor MG1*r* of the first electric motor MG1. The first axis carrier CA0 is relatively non-rotatably coupled to the input shaft 16. The first axis ring gear R0 is relatively non-rotatably coupled to a first rotation shaft 218 rotatable around the first axis CL1. The first rotation shaft 218 is a rotation shaft corresponding to the first rotation shaft 30 of the first example and is relatively non-rotatably coupled to each of the rotor MG2*r* of the second electric motor MG2 and the first output gear 20 as depicted in FIG. 6. Therefore, the rotor MG2*r* of the second electric motor MG2 and the first output gear 20 are relatively non-rotatably coupled to the first axis ring gear R0 of the first axis planetary gear device 214.

In the power transmission device 212 configured as described above, rotation speed of the first axis sun gear S0 is controlled by the first electric motor MG1 to continuously vary a gear ratio γ0 (=rotation speed of the input shaft 16/rotation speed of the first output gear 20) between the input shaft 16 and the first output gear 20. Therefore, the first axis planetary gear device 214 and the first electric motor MG1 can be considered to act as an electric continuously variable transmission. When the first electric motor MG1 is regeneratively operated, the power from the engine 12 is partially converted into electric energy by the first electric motor MG1 and the remainder is mechanically transmitted to the first output gear 20 and, therefore, the first axis planetary gear device 214 has a function of a power distribution mechanism distributing the power from the engine 12 to each of the first electric motor MG1 and the first output gear 20 (the first rotation shaft 218)

This example has the following effect in addition to the effects (A1) to (A9) of the first example. According to this example, the first axis planetary gear device 214 acts as a differential mechanism interposed between the engine 12 and the first output gear 20 and having a differential state controlled by the first electric motor MG1 and is disposed on the first axis CL1, and the first axis planetary gear device 214 and the first electric motor MG1 act as an electric continuously variable transmission. Therefore, the devices such as the first electric motor MG1 and the first axis planetary gear device 214 making up the electric continuously variable transmission can be disposed together on the first axis CL1 in the vehicle 208.

Although the examples of the present invention have been described in detail with reference to the drawings, these are merely an embodiment and the present invention can be implemented in variously modified and improved forms based on the knowledge of those skilled in the art.

For example, although the torque converter 18 includes a lockup clutch LC in the first example, the lockup clutch LC may not be included.

Although the drive device 10, 210 includes the first intermediate axis CLM1 and the second intermediate axis CLM2 in the first and second examples, the first intermediate axis CLM1 and the second intermediate axis CLM2 may not be included and power may directly be transmitted between the first axis CL1 and the second axis CL2 and between the second axis CL2 and the third axis CL3. Although power is transmitted by gears meshed with each other between the first axis CL1 and the second axis CL2 and between the second axis CL2 and the third axis CL3, the power may be transmitted by, for example, chains or timing belts instead of gears.

Although the outer circumferential teeth 24a of the second input gear 24 and the outer circumferential teeth 26a of the second output gear are disposed between the first planetary gear device 40 and the second planetary gear device 42 on the second axis CL2 in the first and second examples, the present invention may not necessarily be limited to such a configuration.

Although the automatic transmission 22 is a four-speed automatic transmission including the first planetary gear device 40 and the second planetary gear device 42 in the first and second examples, the automatic transmission 22 may be an automatic transmission changing speed in two stages, three stages, or five or more stages. The number of the planetary gear devices included in the automatic transmission 22 may not necessarily be two and the automatic transmission 22 may include one or three or more planetary gear devices, or may be a transmission having another structure without a planetary gear device.

Although the bearing 48 is disposed radially inside the bearings 50 and 52 on the second axis CL2 in the first and second examples, each of the bearings 48, 50, and 52 may not be disposed in this way in a conceivable configuration.

Although power is transmitted with speed reduced from the first axis CL1 to the second axis CL2 in the first and second examples, such a speed reduction is not necessarily essential.

Although the engagement positions C1a and C2a of the engagement elements C1 and C2 included in the automatic transmission 22 are disposed radially outside the first planetary gear device 40 while the engagement positions B1a, B2a, and F1a of the engagement elements B1, B2, and F1 included in the automatic transmission 22 are disposed radially outside the second planetary gear device 42 in the first and second examples, an arrangement of the engagement elements C1, C2, B1, B2, and F1 are not limited thereto.

Although the parking lock mechanism 82 is disposed on the second intermediate axis CLM2 in the first and second examples, the parking lock mechanism 82 is not an essential constituent element.

NOMENCLATURE OF ELEMENTS 8, 208: vehicle
10, 210: vehicle drive device
12: engine
20: first output gear
20a: outer circumferential teeth (first axis output portion)
22: automatic transmission (transmission)
24: second input gear
24a: outer circumferential teeth (second axis input portion)
26: second output gear
26a: outer circumferential teeth (second axis output portion)
32: first intermediate transmission member
40: first planetary gear device
42: second planetary gear device
48: bearing (second axis input supporting portion)
50: bearing (second axis output supporting portion)
52: bearing (second axis output supporting portion)
54: second intermediate transmission member
70: differential ring gear
70a: outer circumferential teeth (third axis input portion)
74: drive wheels
82: parking lock mechanism
214: first axis planetary gear device (third planetary gear device)
C1: first clutch (engagement element)
C1a: engagement position
C2: second clutch (engagement element)
C2a: engagement position
B1: first brake (engagement element)
B1a: engagement position
B2: second brake (engagement element)
B2a: engagement position
F1: unidirectional clutch
F1a: engagement position
MG1: first electric motor
MG2: second electric motor
CL1: first axis
CL2: second axis
CL3: third axis
CLM1: first intermediate axis
CLM2: second intermediate axis

The invention claimed is:

1. A vehicle drive device comprising: an engine, a first electric motor, and a second electric motor disposed on a first axis; a first axis output portion outputting power of the first axis; a second axis input portion that is an input portion of a second axis to which power from the first axis output portion is input, the second axis being parallel to the first axis; a second axis output portion outputting power of the second axis; a transmission changing speed between the second axis input portion and the second axis output portion, the transmission being disposed on the second axis; and a third axis input portion that is an input portion of a third axis to which power from the second axis output portion is input, the third axis being parallel to the first axis, the first axis output portion, the second axis input portion, the second axis output portion, and the third axis input portion all being disposed between the first electric motor and the second electric motor in a direction of the first axis, the transmission including at least a first planetary gear device and a second planetary gear device, the second axis input portion and the second axis output portion being disposed between the first planetary gear device and the second planetary gear device in a direction of the second axis.

2. The vehicle drive device of claim 1, wherein
the power from the first axis output portion is transmitted to the second axis input portion via a first intermediate transmission member disposed on a first intermediate axis parallel to the first axis, and wherein
the power from the second axis output portion is transmitted to the third axis input portion via a second intermediate transmission member disposed on a second intermediate axis parallel to the first axis.

3. The vehicle drive device of claim 1, wherein
a second axis input supporting portion supporting the second axis input portion rotatably around the second axis is disposed radially inside a second axis output supporting portion supporting the second axis output portion rotatably around the second axis.

4. The vehicle drive device of claim 1, wherein
power is transmitted with speed reduced from the first axis to the second axis, and wherein
engagement positions of engagement elements included in the transmission are disposed radially outside the first planetary gear device or the second planetary gear device.

5. The vehicle drive device of claim 1, wherein
on the first axis, a third planetary gear device is disposed that is interposed between the engine and the first axis output portion and that has a differential state controlled by the first electric motor, and wherein
the third planetary gear device and the first electric motor act as an electric continuously variable transmission.

6. The vehicle drive device of claim 1, wherein
on the first axis, a fluid transmission device is disposed that has an input-side rotating member coupled to the engine and the first electric motor and an output-side rotating member coupled to the first axis output portion and the second electric motor, and wherein
the fluid transmission device and the first electric motor act as an electric continuously variable transmission.

7. The vehicle drive device of claim 2, wherein
on the second intermediate axis, a parking lock mechanism is disposed that mechanically disables rotation of drive wheels.

8. The vehicle drive device of claim 1, wherein
the first axis output portion, the second axis input portion, the second axis output portion, and the third axis input portion are positioned relative to the first electric motor and the second electric motor, without any of the first axis output portion, the second axis input portion, the second axis output portion and the third axis input portion overlapping with the first and second electric motors in a radial direction that is perpendicular to the direction of the first axis.

9. The vehicle drive device of claim 1, wherein
the second axis input portion is positioned relative to the second axis output portion, such that at least a portion of a second axis input portion overlaps with the second axis output portion in a radial direction that is perpendicular to the direction of the second axis.

* * * * *